US012646221B2

(12) United States Patent
Chen et al.

(10) Patent No.: US 12,646,221 B2
(45) Date of Patent: Jun. 2, 2026

(54) POINT CLOUD ATTRIBUTE ENCODING METHOD AND APPARATUS, DECODING METHOD AND APPARATUS, AND RELATED DEVICE

(71) Applicant: PENG CHENG LABORATORY, Shenzhen (CN)

(72) Inventors: Yueru Chen, Shenzhen (CN); Jing Wang, Shenzhen (CN); Ge Li, Shenzhen (CN); Wen Gao, Shenzhen (CN)

(73) Assignee: PENG CHENG LABORATORY, Shenzhen (CN)

( * ) Notice: Subject to any disclaimer, the term of this patent is extended or adjusted under 35 U.S.C. 154(b) by 315 days.

(21) Appl. No.: 18/562,799

(22) PCT Filed: Jun. 10, 2022

(86) PCT No.: PCT/CN2022/098265
§ 371 (c)(1),
(2) Date: Nov. 20, 2023

(87) PCT Pub. No.: WO2022/258063
PCT Pub. Date: Dec. 15, 2022

(65) Prior Publication Data
US 2024/0233194 A1 Jul. 11, 2024

(30) Foreign Application Priority Data

Jun. 11, 2021 (CN) .......................... 202110656783.9

(51) Int. Cl.
*G06T 9/00* (2006.01)
*H04N 13/161* (2018.01)
(Continued)

(52) U.S. Cl.
CPC ................ *G06T 9/001* (2013.01); *G06T 9/00* (2013.01); *H04N 13/161* (2018.05);
(Continued)

(58) Field of Classification Search
CPC ......... G06T 9/001; G06T 9/00; H04N 13/161; H04N 19/102; H04N 19/115;
(Continued)

(56) References Cited

U.S. PATENT DOCUMENTS

2021/0049828 A1 2/2021 Park et al.
2024/0233194 A1* 7/2024 Chen ................... H04N 19/597

FOREIGN PATENT DOCUMENTS

CN 108335335 A 7/2018
CN 109979008 A 7/2019
(Continued)

*Primary Examiner* — Ross Varndell
(74) *Attorney, Agent, or Firm* — The Webb Law Firm

(57) ABSTRACT

A point cloud attribute encoding method and apparatus, a decoding method and apparatus, and a related device are disclosed. The point cloud attribute encoding method includes sorting all point cloud data to be encoded to acquire sorted point cloud data, the point cloud data to be encoded being point cloud data with attributes to be encoded; grouping the sorted point cloud data based on correlation between the sorted point cloud data to acquire groups to be encoded; and performing point cloud attribute encoding based on the groups to be encoded. It is beneficial for enhancing the correlation between point cloud data within the group, improving the efficiency of decorrelation during intra group transform after grouping, and improving coding efficiency.

14 Claims, 8 Drawing Sheets

(51) Int. Cl.

| | |
|---|---|
| *H04N 19/102* | (2014.01) |
| *H04N 19/115* | (2014.01) |
| *H04N 19/124* | (2014.01) |
| *H04N 19/176* | (2014.01) |
| *H04N 19/597* | (2014.01) |
| *H04N 19/625* | (2014.01) |
| *H04N 19/91* | (2014.01) |

(52) U.S. Cl.

CPC ......... *H04N 19/102* (2014.11); *H04N 19/115* (2014.11); *H04N 19/124* (2014.11); *H04N 19/176* (2014.11); *H04N 19/597* (2014.11); *H04N 19/625* (2014.11); *H04N 19/91* (2014.11)

(58) Field of Classification Search

CPC .. H04N 19/124; H04N 19/176; H04N 19/597; H04N 19/625; H04N 19/91

See application file for complete search history.

(56) References Cited

FOREIGN PATENT DOCUMENTS

| | | | |
|---|---|---|---|
| CN | 111953998 A | 11/2020 | |
| WO | 2021062772 A1 | 4/2021 | |
| WO | WO-2021062771 A1 * | 4/2021 | ........... H04N 19/103 |

* cited by examiner

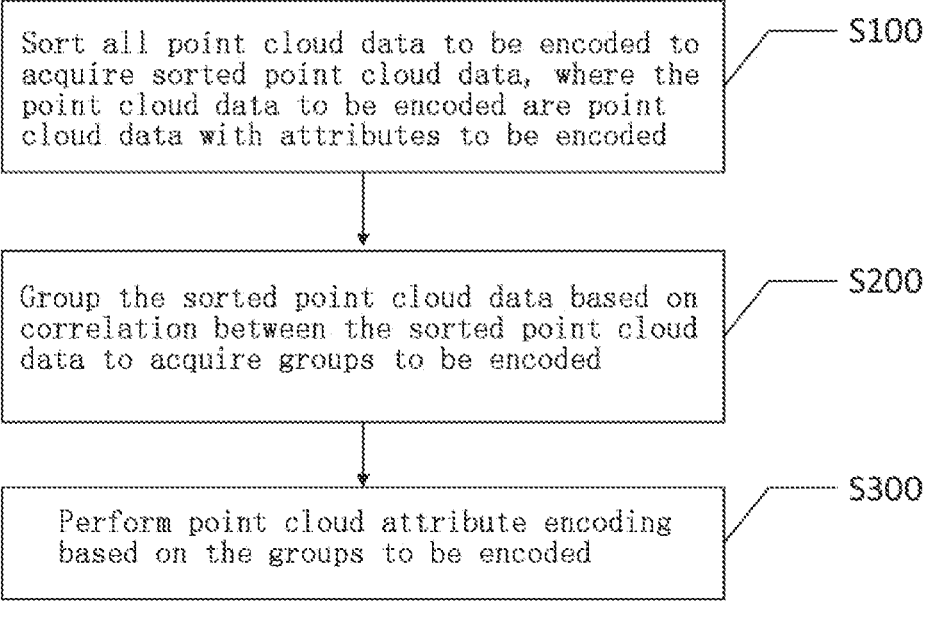

Sort all point cloud data to be encoded to acquire sorted point cloud data, where the point cloud data to be encoded are point cloud data with attributes to be encoded — S100

Group the sorted point cloud data based on correlation between the sorted point cloud data to acquire groups to be encoded — S200

Perform point cloud attribute encoding based on the groups to be encoded — S300

FIG. 1

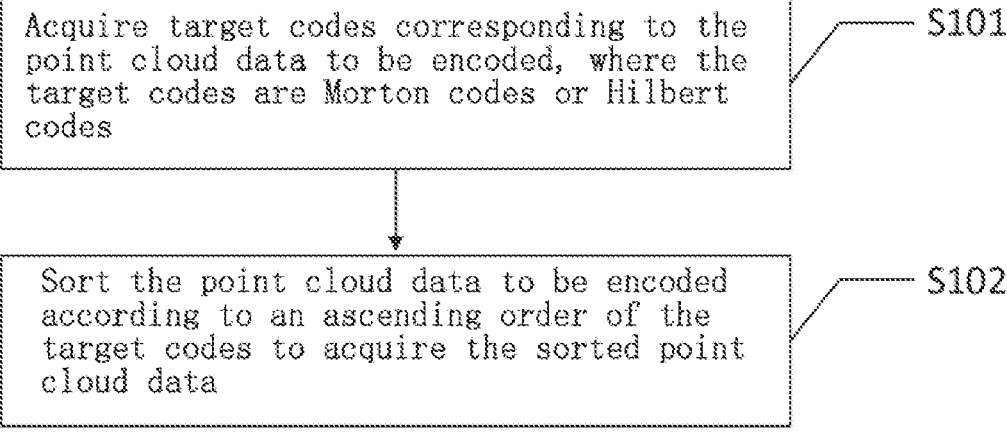

Acquire target codes corresponding to the point cloud data to be encoded, where the target codes are Morton codes or Hilbert codes — S101

Sort the point cloud data to be encoded according to an ascending order of the target codes to acquire the sorted point cloud data — S102

FIG. 2

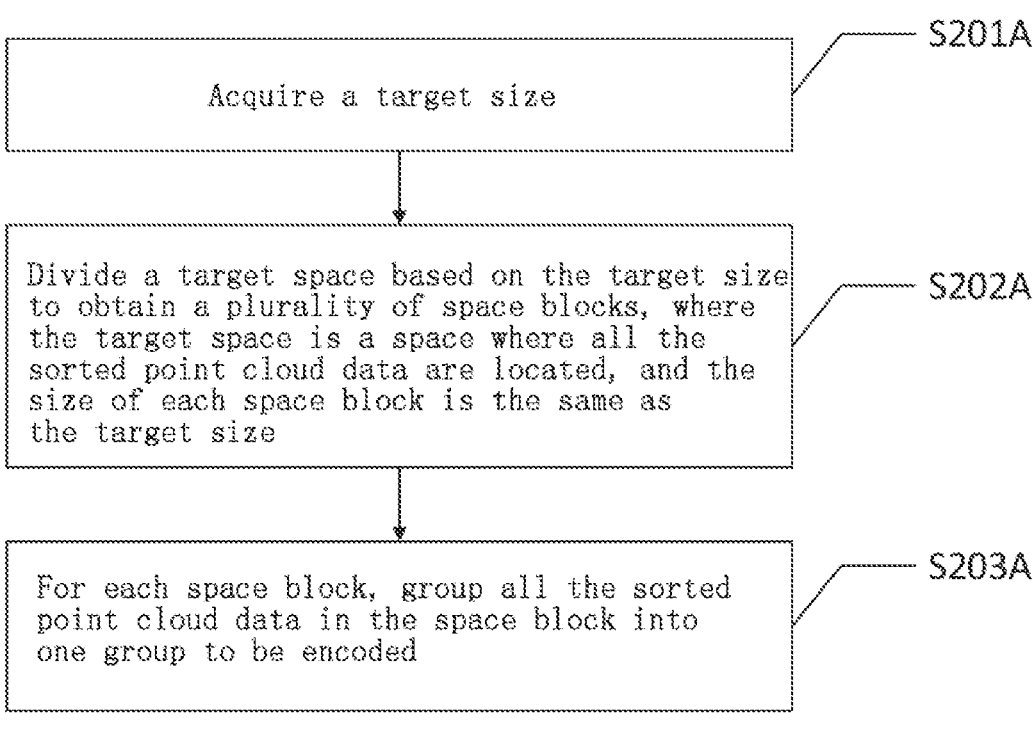

S201A

Acquire a target size

S202A

Divide a target space based on the target size to obtain a plurality of space blocks, where the target space is a space where all the sorted point cloud data are located, and the size of each space block is the same as the target size

S203A

For each space block, group all the sorted point cloud data in the space block into one group to be encoded

FIG. 3

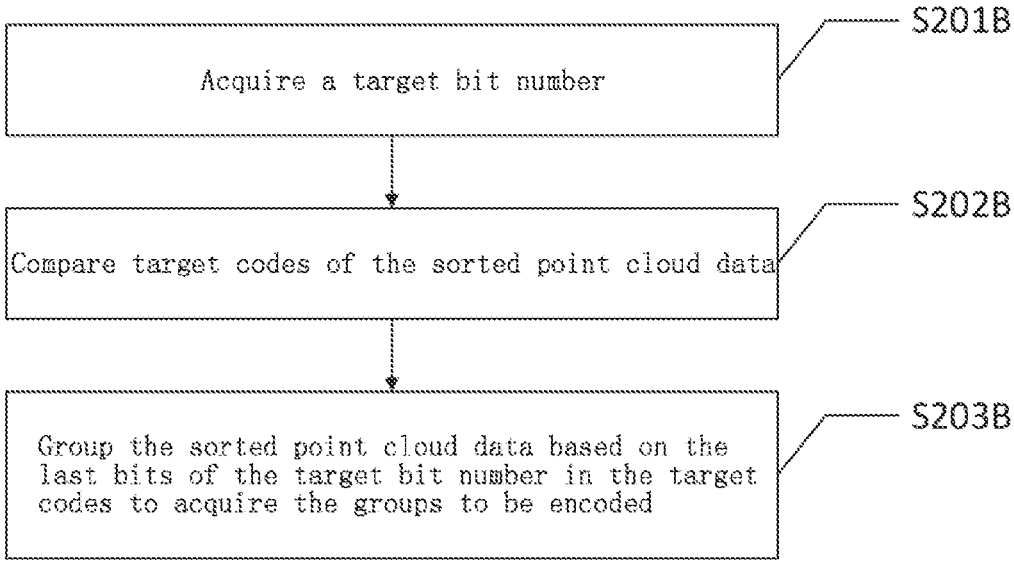

S201B

Acquire a target bit number

S202B

Compare target codes of the sorted point cloud data

S203B

Group the sorted point cloud data based on the last bits of the target bit number in the target codes to acquire the groups to be encoded

FIG. 4

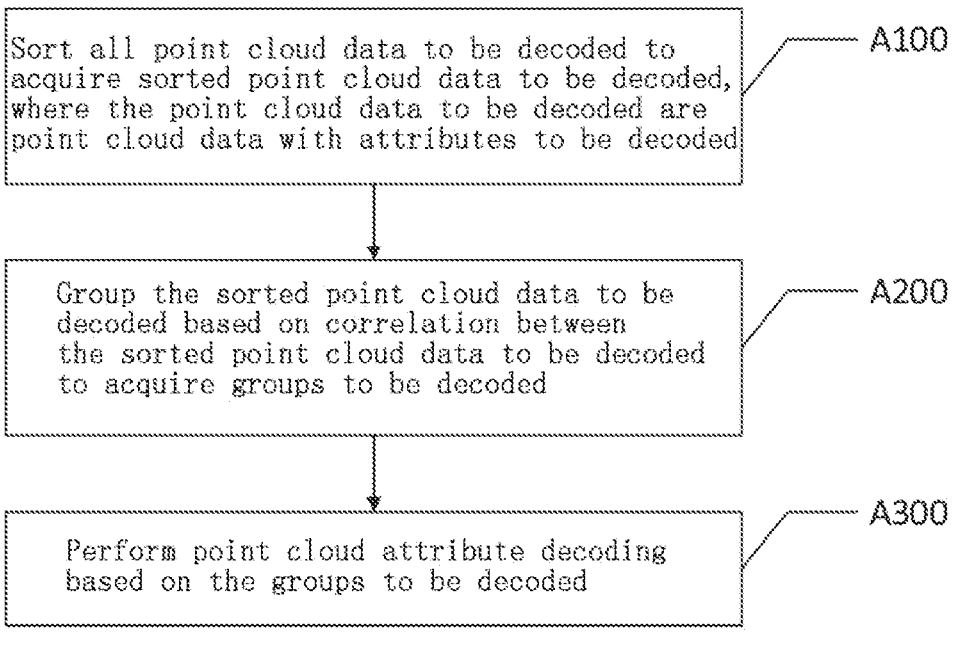

Sort all point cloud data to be decoded to
acquire sorted point cloud data to be decoded,
where the point cloud data to be decoded are
point cloud data with attributes to be decoded

— A100

Group the sorted point cloud data to be
decoded based on correlation between
the sorted point cloud data to be decoded
to acquire groups to be decoded

— A200

Perform point cloud attribute decoding
based on the groups to be decoded

Perform entropy decoding and inverse
quantization on each of the groups to be decoded
to obtain transform coefficients of each of
the groups to be decoded

— A301

Perform inverse discrete cosine transform on the
transform coefficients of the groups to be
decoded based on the points number of the sorted
point cloud data to be decoded in each of the
groups to be decoded to obtain attribute
reconstruction values corresponding to each of
the groups to be decoded

Comparison for equality          L=3

| Data point1 | 1 | 0 | 1 | 1 | 1 | 0 | 0 | 0 | 1 |
| Data point2 | 1 | 0 | 1 | 1 | 1 | 0 | 1 | 1 | 0 |
| Data point3 | 1 | 0 | 1 | 1 | 1 | 1 | 0 | 1 | 0 |
| Data point4 | 1 | 0 | 1 | 1 | 1 | 1 | 0 | 1 | 1 |

9-bit Hilbert code

FIG. 13

POINT CLOUD ATTRIBUTE ENCODING METHOD AND APPARATUS, DECODING METHOD AND APPARATUS, AND RELATED DEVICE

CROSS-REFERENCE TO RELATED APPLICATIONS

This application is the United States national phase of International Patent Application No. PCT/CN2022/098265 filed Jun. 10, 2022, and claims priority to Chinese Patent Application No. 202110656783.9 filed Jun. 11, 2021, the disclosures of which are hereby incorporated by reference in their entireties.

1. TECHNICAL FIELD

The present invention relates to the technical field of data processing, and in particular, to a point cloud attribute encoding method and apparatus, decoding method and apparatus, and a related device.

2. TECHNICAL CONSIDERATIONS

With the rapid development of science and technology, especially the development of computer technology, technologies such as three-dimensional reconstruction have been widely applied to various fields such as building design, game development, and heritage conservation. Point cloud compression encoding and decoding technology is one of the key technologies of three-dimensional reconstruction. The point cloud is obtained by sampling a surface of an object by a three-dimensional scanning device, and each point cloud may include various attribute information, such as color information, reflectance information. The purpose of point cloud compression encoding and decoding is to remove redundancy as much as possible while preserving original attribute information of massive point cloud data, thereby improving system storage and transmission efficiency.

In the prior art, when point cloud attribute compression is performed, it is common practice to first group the point clouds, and then perform attribute compression on each group in sequence. In the grouping process of the point clouds, all the point cloud data are typically grouped according to a specific one-dimensional point cloud order. A problem with the prior art lies in the fact that the grouping based solely on one-dimensional order cannot effectively reflect correlation between the point cloud data, which affects efficiency of decorrelation during intra-group transform after grouping, and affects encoding efficiency.

Therefore, there is still room for improvement and development in the prior art.

SUMMARY

The present invention mainly aims at providing a point cloud attribute encoding method and apparatus, decoding method and apparatus, and a related device, aiming at solving problems in the prior art where all point cloud data are grouped according to a specific one-dimensional point cloud order, while the grouping depending solely on one-dimensional order cannot effectively reflect correlation between the point cloud data, which affects efficiency of decorrelation during intra-group transform after grouping, and affects encoding efficiency.

In order to achieve the above purposes, a first aspect of the present invention provides a point cloud attribute encoding method, wherein the method includes:

a point cloud attribute encoding method, the method includes:

sorting all point cloud data to be encoded to acquire sorted point cloud data, wherein the point cloud data to be encoded are point cloud data with attributes to be encoded;

grouping the sorted point cloud data based on correlation between the sorted point cloud data to acquire groups to be encoded; and performing point cloud attribute encoding based on the groups to be encoded.

Optionally, the correlation between the sorted point cloud data includes a spatial position relationship of the sorted point cloud data.

Optionally, the sorting all the point cloud data to be encoded to acquire the sorted point cloud data, includes:

acquiring target codes corresponding to the point cloud data to be encoded, wherein the target codes are Morton codes or Hilbert codes; and sorting the point cloud data to be encoded according to an ascending order of the target codes to acquire the sorted point cloud data.

Optionally, the grouping the sorted point cloud data based on the correlation between the sorted point cloud data to acquire groups to be encoded, includes:

acquiring a target size;

dividing a target space based on the target size to obtain a plurality of space blocks, wherein the target space is a space where all the sorted point cloud data are located, and a size of each space block is the same as the target size; and for each space block, grouping all the sorted point cloud data in the space block into one group to be encoded.

Optionally, the grouping the sorted point cloud data based on the correlation between the sorted point cloud data to acquire groups to be encoded, includes:

acquiring a target bit number;

comparing target codes of the sorted point cloud data; and grouping the sorted point cloud data based on the last bits of the target bit number in the target codes to acquire the groups to be encoded.

Optionally, the grouping the sorted point cloud data based on the last bits of the target bit number in the target codes to acquire the groups to be encoded, includes:

grouping the sorted point cloud data to obtain the groups to be encoded by grouping the sorted point cloud data with the same last bits of the target bit number in the target codes into one group to be encoded.

Optionally, the acquiring a target bit number includes:

acquiring a points number of the sorted point cloud data and a maximum side length corresponding to all the sorted point cloud data, wherein the maximum side length is a length of the longest side of the minimum cuboid bounding box corresponding to all the sorted point cloud data;

acquiring a target mean points number of the groups to be encoded; and calculating the target bit number, wherein $$L = 3 * \left( \log_2(maxSize) - \frac{\log_2\left(\frac{N}{K_{mean}}\right)}{2} \right),$$

3

L is a target bit number, maxSize is the maximum side length, N is the points number of the sorted point cloud data, and $K_{mean}$ is the target mean points number.

Optionally, the performing point cloud attribute encoding based on the groups to be encoded, includes:

acquiring a maximum points number;

for each group to be encoded, if a points number of the sorted point cloud data in the group to be encoded is greater than the maximum points number, taking the group to be encoded as a group to be subdivided; otherwise, taking the group to be encoded as a qualified group to be encoded;

for each group to be subdivided, subdividing the sorted point cloud data in the group to be subdivided to acquire a plurality of target subdivided groups to be encoded, wherein the points number of the sorted point cloud data in each of the target subdivided groups to be encoded is not greater than the maximum points number;

taking the qualified groups to be encoded and the target subdivided group to be encoded as target groups to be encoded; and performing point cloud attribute encoding based on the target groups to be encoded.

Optionally, among the plurality of target subdivided groups to be encoded corresponding to each group to be subdivided, the points number of the sorted point cloud data in one target subdivided group to be encoded is not greater than the maximum points number, and the points number of the sorted point cloud data in other target subdivided groups to be encoded is equal to the maximum points number.

Optionally, the performing point cloud attribute encoding based on the target groups to be encoded, includes:

performing forward discrete cosine transform on each of the target groups to be encoded based on the points number of the sorted point cloud data in each of the target groups to be encoded to acquire transform coefficients of each of the target groups to be encoded; and performing quantization and entropy encoding on the transform coefficients of each of the target groups to be encoded.

A second aspect of the present invention provides a point cloud attribute encoding apparatus, the apparatus includes:

a sorting module for point cloud data to be encoded, configured for sorting all point cloud data to be encoded to acquire sorted point cloud data, wherein the point cloud data to be encoded are point cloud data with attributes to be encoded;

a grouping module for point cloud data to be encoded, configured for grouping the sorted point cloud data based on correlation between the sorted point cloud data to acquire groups to be encoded; and an encoding module for point cloud data, configured for performing point cloud attribute encoding based on the groups to be encoded.

A third aspect of the present invention provides a point cloud attribute decoding method, the method includes:

sorting all point cloud data to be decoded to acquire sorted point cloud data to be decoded, wherein the point cloud data to be decoded are point cloud data with attributes to be decoded;

grouping the sorted point cloud data to be decoded based on correlation between the sorted point cloud data to be decoded to acquire groups to be decoded; and performing point cloud attribute decoding based on the groups to be decoded.

Optionally, the correlation between the sorted point cloud data to be decoded includes a spatial position relationship of the sorted point cloud data to be decoded.

Optionally, the performing point cloud attribute decoding based on the groups to be decoded, includes:

performing entropy decoding and inverse quantization on each of the groups to be decoded to obtain transform coefficients of each of the groups to be decoded; and performing inverse discrete cosine transform on the transform coefficients of each of the groups to be decoded based on the points number of the sorted point cloud data to be decoded in each of the groups to be decoded to obtain attribute reconstruction values corresponding to each of the groups to be decoded.

A fourth aspect of the present invention provides a point cloud attribute decoding apparatus, the apparatus includes:

a sorting module for point cloud data to be decoded, configured for sorting all point cloud data to be decoded to acquire sorted point cloud data to be decoded, wherein the point cloud data to be decoded are point cloud data with attributes to be decoded;

a grouping module for point cloud data to be decoded, configured for grouping the sorted point cloud data to be decoded based on correlation between the sorted point cloud data to be decoded to acquire groups to be decoded; and a decoding module for point cloud data, configured for performing point cloud attribute decoding based on the groups to be decoded.

A fifth aspect of the present invention provides an intelligent terminal, including a memory, a processor, and a point cloud attribute encoding program stored in the memory and executable on the processor, wherein the point cloud attribute encoding program, when executed by the processor, implements the point cloud attribute encoding method as described in any one of embodiments above.

A sixth aspect of the present invention provides a computer readable storage medium, wherein a point cloud attribute encoding program is stored on the computer readable storage medium, and the point cloud attribute encoding program, when executed by a processor, implements the point cloud attribute encoding method as described in any one of the embodiments above.

As can be seen from the above, the point cloud attribute encoding method in the solutions of the present invention includes: sorting all the point cloud data to be encoded to acquire the sorted point cloud data, wherein the point cloud data to be encoded are the point cloud data with attributes to be encoded; grouping the sorted point cloud data based on the correlation between the sorted point cloud data to acquire the groups to be encoded; and performing point cloud attribute encoding based on the groups to be encoded. Compared with the prior art, in the solutions of the present invention, after sorting the point cloud data to be encoded, grouping is performed based on the correlation to obtain the groups to be encoded, and then the point cloud attribute encoding is performed based on the groups to be encoded. It is beneficial for enhancing the correlation between the point cloud data in the group, improving efficiency of decorrelation during intra group transform after grouping, and improving encoding efficiency.

BRIEF DESCRIPTION OF THE DRAWINGS

In order to more clearly illustrate the technical solutions of the embodiments of the present invention, the drawings used to describe the embodiments or the prior art will be briefly introduced below. Apparently, the drawings that are described below are only some embodiments of the present invention, and those of ordinary skills in the art can obtain other drawings according to these drawings without creative work.

FIG. 1 is a schematic flowchart of a point cloud attribute encoding method provided in non-limiting embodiments of the present invention;

FIG. 2 is a specific schematic flowchart of step S100 provided in the non-limiting embodiments of the present invention in FIG. 1;

FIG. 3 is a specific schematic flowchart of step S200 provided in the non-limiting embodiments of the present invention in FIG. 1;

FIG. 4 is another specific schematic flowchart of step S200 provided in the non-limiting embodiments of the present invention in FIG. 1;

FIG. 8 is a schematic flowchart of a point cloud attribute decoding method provided in non-limiting embodiments of the present invention;

FIG. 9 is a specific schematic flowchart of step A300 provided in the non-limiting embodiments of the present invention in FIG. 8;

FIG. 13 is a schematic diagram of a grouping form after calculating a target bit number in non-limiting embodiments of the present invention.

DETAILED DESCRIPTION

Figure 5:
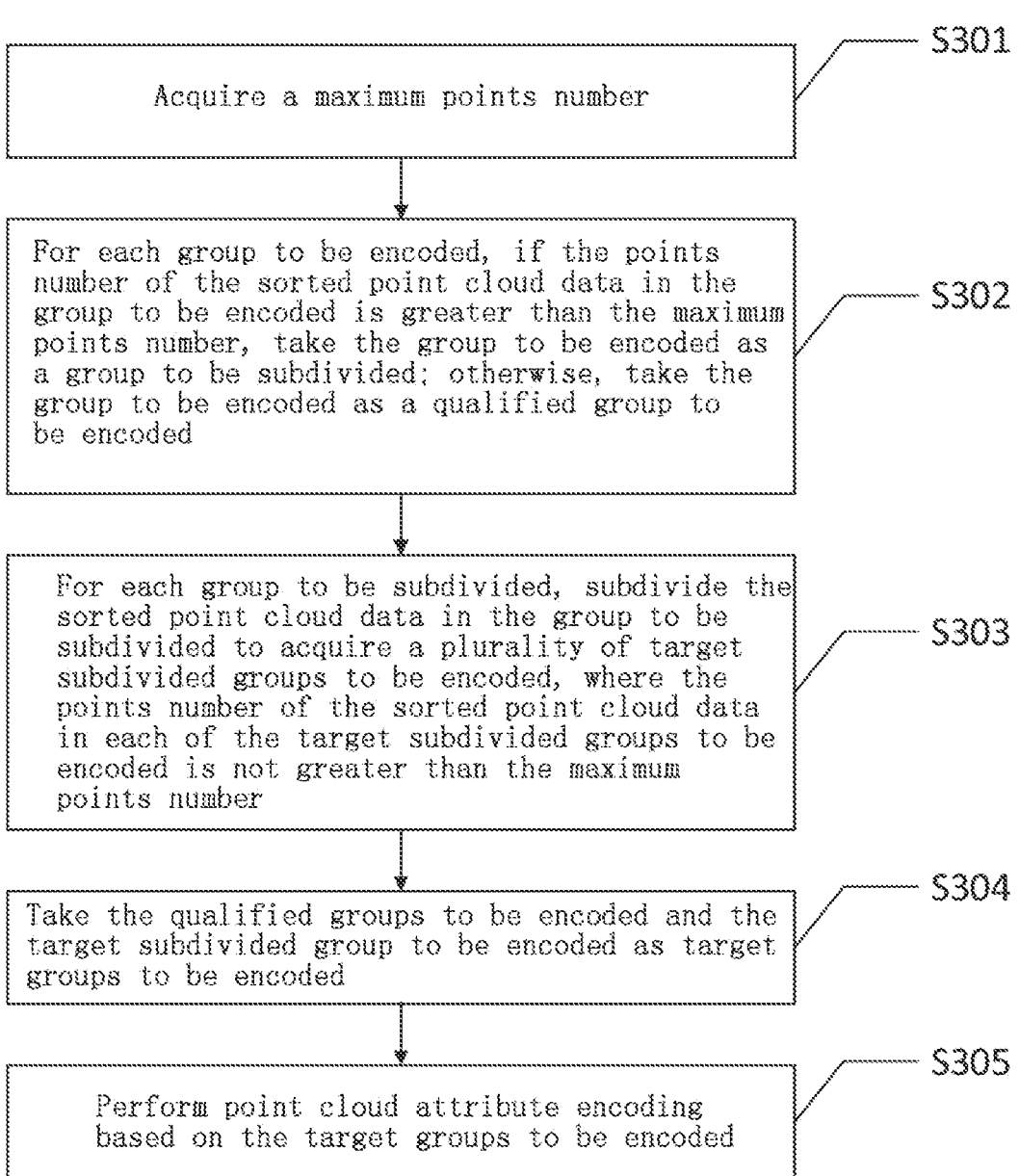
FIG. 5 is a specific schematic flowchart of step S300 provided in the non-limiting embodiments of the present invention in FIG. 1.

In the following description, specific details, such as specific system structure and technology, are put forward for purpose of illustration rather than limitation, so as to thoroughly understand the embodiments of the present invention. However, it should be clear to those having ordinary skills in the art that the present invention can be practiced in other embodiments without these specific details. In other cases, detailed descriptions of well-known modules, apparatuses, circuits and methods are omitted so as not to hinder the description of the embodiments of the present invention with unnecessary details.

It should be understood that, when used in this specification and the appended claims, the term "including/comprising" indicates the presence of the described features, integers, steps, operations, elements, and/or components, but does not preclude the presence or addition of one or more other features, integers, steps, operations, elements, components, and/or sets thereof.

It should also be understood that the terms used in the specification of the present invention are for the purpose of describing specific embodiments only and are not intended to limit the present invention. As used in the specification and the appended claims of the present invention, the singular forms "a". "an", and "the" are intended to include the plural forms unless the context clearly dictates otherwise.

It should also be further understood that the term "and/or" as used in the specification and the appended claims of the present invention refers to any combination of one or more of the associated listed items and the possible combinations thereof, and includes these combinations.

As used in this specification and the appended claims, the term "if" may be interpreted as "when . . . " or "once" or "in response to determining" or "in response to detecting". Similarly, the phrase "if determining" or "if a [described condition or event] is detected" may be construed to mean "once it is determined" or "in response to determining" or "once [the described condition or event] is detected" or "in response to detecting [the described condition or event]".

The following clearly and completely describes the technical solutions in the embodiments of the present invention with reference to the drawings in the embodiments of the present invention. Apparently, the described embodiments are merely some but not all of the embodiments of the present invention. Based on the embodiments of the present invention, all other embodiments obtained by those having ordinary skills in the art without going through any creative work shall fall within the scope of protection of the present invention.

Numerous specific details are set forth in the following description to facilitate a thorough understanding of the present invention, but the present invention may also be practiced in other ways different from those described herein, and those having ordinary skills in the art may perform similar adaptations without departing from the essence of the present invention. Therefore, the present invention is not limited by the specific embodiments disclosed below.

With the rapid development of science and technology, especially the development of computer technology, technologies such as three-dimensional reconstruction have been widely applied to various fields such as building design, game development, and heritage conservation. Point cloud compression encoding and decoding technology is one of the key technologies of three-dimensional reconstruction. The point cloud is obtained by sampling a surface of an object by a three-dimensional scanning device, and each point cloud may include various attribute information, such as color information, reflectance information. The purpose of point cloud compression encoding and decoding is to remove redundancy as much as possible while preserving original attribute information of massive point cloud data, thereby improving system storage and transmission efficiency.

In the prior art, when point cloud attribute compression is performed, it is common practice to first group the point cloud data, and then perform attribute compression on each group in turn. A problem with the prior art lies in the fact, that in the process of grouping the point cloud data, K points are typically grouped into one group in turn according to a specific one-dimensional point cloud order and a set fixed value K until all points are grouped. The problem with the prior art lies in the fact that converting point cloud data with three-dimensional geometry into one-dimensional point cloud order with simple order information has lost part of the three-dimensional coordinate information, and grouping based solely on the one-dimensional order cannot effectively reflect the correlation between the point cloud data, cannot effectively utilize the spatial position information between the geometric point data, and cannot ensure that the geometry point positions in the group are the closest. Therefore, it is impossible to ensure that the attribute values of the geometric points in the group have strong correlation, which affects efficiency of decorrelation when performing intra-group transform after grouping, and affects encoding efficiency and attribute compression effects.

In order to solve the problems of the prior art, the present invention provides a point cloud attribute encoding method, in some embodiments, including: sorting all point cloud data to be encoded to acquire sorted point cloud data, wherein the point cloud data to be encoded are point cloud data with attributes to be encoded; grouping the sorted point cloud data based on correlation between the sorted point cloud data to acquire groups to be encoded; and performing point cloud attribute encoding based on the groups to be encoded. Compared with the prior art, in the solutions of the present invention, after sorting the point cloud data to be encoded, grouping is performed based on the correlation to obtain the groups to be encoded, and then the point cloud attribute encoding is performed based on the groups to be encoded. It is beneficial for enhancing the correlation between the point cloud data in the group, improving efficiency of decorrelation during intra-group transform after grouping, and improving encoding efficiency. Meanwhile, the embodiments of the present invention further provide a point cloud attribute encoding apparatus, a point cloud attribute decoding method and a point cloud attribute decoding apparatus corresponding to the point cloud attribute encoding method above.

As shown in FIG. 1, the non-limiting embodiments of the present invention provide a point cloud attribute encoding method, specifically, the method includes:

Step S100: sorting all point cloud data to be encoded to acquire sorted point cloud data, wherein the point cloud data to be encoded are point cloud data with attributes to be encoded.

The point cloud data refers to a set of vectors in a three-dimensional coordinate system. In this embodiment, the point cloud data to be encoded may be point cloud data obtained by scanning, such as point cloud scanned by LIDAR, or point cloud used by VR, and the like. Each point cloud is recorded in the form of points, and each point contains three-dimensional coordinates and attribute information (such as color information and reflectance information). The point cloud encoding mainly includes geometry encoding and attribute encoding, and the embodiments of the present invention mainly implement the point cloud attribute encoding, such as encoding a color attribute of the point cloud.

Step S200: grouping the sorted point cloud data based on correlation between the sorted point cloud data to acquire groups to be encoded.

The correlation above reflects the correlation between the sorted point cloud data. When grouping, the point cloud data with strong correlation are grouped into one group. In an application scenario, a correlation evaluation rules and a correlation threshold may be preset, the correlation between the sorted point cloud data may be evaluated to obtain corresponding correlation values, and the sorted point cloud data with the correlation values being greater than the correlation threshold may be divided into the same group. In another application scenario, clustering may also be performed based on the correlation between the sorted point cloud data, which is not specifically limited here. Grouping based on the above correlation can effectively utilize the correlation between the point cloud data, so that attribute values of geometry points in each of the groups to be encoded have strong correlation.

Step S300: performing point cloud attribute encoding based on the groups to be encoded.

It can be seen from the above that the point cloud attribute encoding method provided by the embodiments of the present invention sorts all the point cloud data to be encoded to acquire the sorted point cloud data, wherein the point cloud data to be encoded are the point cloud data with attributes to be encoded; groups the sorted point cloud data based on the correlation between the sorted point cloud data to acquire the groups to be encoded; and performs point cloud attribute encoding based on the groups to be encoded.

Compared with the prior art, in the solutions of the present invention, after sorting the point cloud data to be encoded, grouping is performed based on the correlation to obtain the groups to be encoded, and then the point cloud attribute encoding is performed based on the groups to be encoded. It is beneficial for enhancing the correlation between the point cloud data in the group, improving efficiency of decorrelation during intra-group transform after grouping, and improving encoding efficiency.

Specifically, in this embodiment, the correlation between the sorted point cloud data includes a spatial position relationship of the sorted point cloud data.

Specifically, when the geometry points in the group are closer in space, the corresponding attribute values also have better correlation. Therefore, in this embodiment, grouping based on spatial position relationship of the sorted point cloud data can enhance the correlation between the attribute values related to the geometry points corresponding to the sorted point cloud data in each group to be encoded, improve the efficiency of decorrelation during intra-group transform, and achieve better compression effects.

Specifically, in this embodiment, as shown in FIG. 2, the step S100 includes:

step S101: acquiring target codes corresponding to the point cloud data to be encoded, wherein the target codes are Morton codes or Hilbert codes; and step S102: sorting the point cloud data to be decoded according to an ascending order of the target codes to acquire the sorted point cloud data.

Specifically, the corresponding Morton codes or Hilbert codes are obtained by calculation according to the geometry coordinates of the point cloud data to be encoded, and then a sequence corresponding to the sorted point cloud data is obtained by sorting the Morton codes or Hilbert codes according to an ascending order. The above sorting process may determine the order between groups after grouping, and the grouping refers to combining adjacent points according to the order in the sorted point cloud data.

This embodiment provides a grouping method. As shown in FIG. 3, the step S200 includes the following steps.

Step S201A: acquiring a target size.

Step S202A: dividing a target space based on the target size to obtain a plurality of space blocks, wherein the target space is a space where all the sorted point cloud data are located, and the size of each space block is the same as the target size.

Step S203A: for each space block, grouping all the sorted point cloud data in the space block into one group to be encoded.

The target size is the size of each space block required to be obtained when dividing the target space, which may be preset or input by a user, and may also be adjusted according to distribution of the specific sorted point cloud data and the size of the target space, and is not specifically limited here. In an application scenario, the target size is a side length of each space block required to be obtained.

Specifically, the target space is equally divided to obtain the plurality of space blocks. For example, an octree division method may be used according to the target size: assuming that a maximum side length of the target space is H, a cube of H×H×H is constructed and divided into eight cubes with a side length of H/2 for the first time; for the second time, each cube with a side length of H/2 is divided into eight cubes with a side length of H/4, and so on, until the size of the divided block reaches the target size, and the space blocks with equal size are obtained. The geometry size of each space block is S (that is, the target size), and points in the space block are grouped into one group.

In an embodiment, the acquiring a target size includes:

acquiring a points number of the sorted point cloud data and a maximum side length corresponding to all the sorted point cloud data, wherein the maximum side length is the length of the longest side of the minimum cuboid bounding box corresponding to all the sorted point cloud data;

acquiring a target mean points number of the groups to be encoded; and calculating the target size, wherein $S = 2^{L/3}$, $$L = 3 * \left( \log_2(\text{maxSize}) - \frac{\log_2\left(\frac{N}{K_{mean}}\right)}{2} \right),$$

L is the target bit number, maxSize is the maximum side length, N is the points number of the sorted point cloud data, and $K_{mean}$ is the target mean points number.

This embodiment further provides another grouping method. As shown in FIG. 4, the step S200 includes the following steps.

Step S201B: acquiring a target bit number.

Step S202B: comparing target codes of the sorted point cloud data.

Step S203B: grouping the sorted point cloud data based on the last bits of the target bit number in the target codes to acquire the groups to be encoded.

The target bit number is a bit number of the target codes used for comparison, which may be preset or input by a user, and may also be adjusted according to distribution of the specific sorted point cloud data, and is not specifically limited here. Specifically, in this embodiment, the target bit number is denoted as L, and then the sorted point cloud data are grouped based on the last L bits in the target codes to obtain the groups to be encoded.

Specifically, the step 203B includes: grouping the sorted point cloud data with the same last bits of the target bit number in the target codes into one group to be encoded. Dividing the sorted point cloud data to obtain the groups to be encoded. Specifically, grouping based on the last bits of the target bit number in the Morton codes or Hilbert codes can enhance the spatial correlation of the sorted point cloud data in the groups to be encoded.

In this embodiment, the target bit number is calculated according to the actual situation of the sorted point cloud data. Specifically, the step S201B includes: acquiring a points number of the sorted point cloud data and a maximum side length corresponding to all the sorted point cloud data, wherein the maximum side length is the length of the longest side of the minimum cuboid bounding box corresponding to all the sorted point cloud data; acquiring a target mean points number of the groups to be encoded; and calculating the target bit number, wherein $$L = 3 * \left( \log_2(\text{maxSize}) - \frac{\log_2\left(\frac{N}{K_{mean}}\right)}{2} \right),$$

L is the target bit number, maxSize is the maximum side length, N is the points number of the sorted point cloud data, and $K_{mean}$ is the target mean points number.

maxSize is the maximum side length of all the sorted point cloud data with fixed-point geometry coordinates. Specifically, original geometry coordinates may be decimals, which are converted into integers and enlarged to a certain extent, so that coordinates of all points do not overlap due to integer conversion, and then the minimum cuboid bounding box of all the point cloud data is calculated, and the length of the longest side of the minimum cuboid bounding box is taken as the maximum side length maxSize. $\log_2(\text{maxSize})$ represents a logarithmic function with base being 2 and power being maxSize. Similarly, $$\log_2\left(\frac{N}{K_{mean}}\right)$$

represents a logarithmic function with base being 2 and power being $$\frac{N}{K_{mean}}.$$

The target mean points number $K_{mean}$ is a preset target mean value of the points number of the sorted point cloud data in all the groups to be encoded after grouping, which may be set and adjusted according to actual demands, and is not specifically limited here. After grouping according to the calculated target bit number, the actual mean points number $$K'_{mean}$$

of all the groups to be encoded is close to the above target mean points number $K_{mean}$. The formula for calculating the target bit number L is obtained based on the statistical characteristic of the point cloud data, that is, N is approximately proportional to the square of maxSize.

In an application scenario, the above two grouping methods may correspond to each other. Specifically. $S = 2^{L/3}$ may be set. When Morton codes are used as target codes, according to the above calculation rules, when L is a multiple of 3, the two grouping methods are equivalent to each other. If S is not an exponential form of 2, the first grouping method (the method of dividing into the space blocks) is better. The second grouping method (that is, the method of grouping the sorted point cloud data with the same last L bits in the target codes into one group) gives some special cases (for example, S is the exponential form of 2), and has some extensibility (for example, it can be better applied to a scenario using Hilbert codes as target codes).

Figure 12:
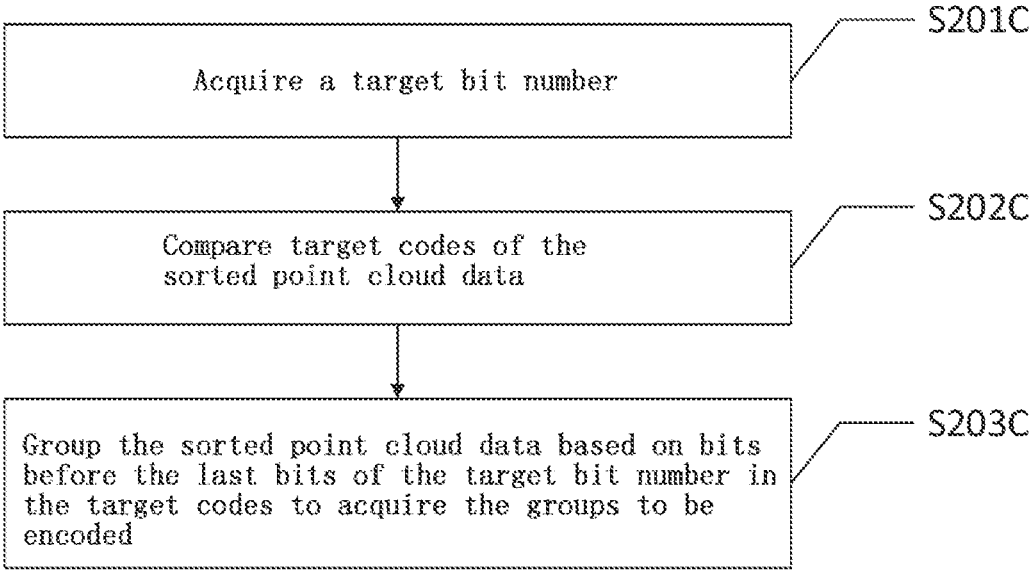
FIG. 12 is another specific schematic flowchart of step S200 provided in the non-limiting embodiments of the present invention in FIG. 1.

This embodiment further provides another grouping method. As shown in FIG. 12, the step S200 includes the following steps.

Step S201C: acquiring a target bit number.

Step S202C: comparing target codes of the sorted point cloud data.

Step S203C: grouping the sorted point cloud data based on bits before the last bits of the target bit number in the target codes to acquire the groups to be encoded.

Specifically, in this embodiment, the target bit number is denoted as L, the bits before the last bits of the target bit number refer to the remaining bits after subtracting L bits from the total bits in the target codes, the numerical values of the remaining bits are compared, and the sorted point cloud data with the same values are grouped into one group to be encoded.

Specifically, the target codes in the step S202C may be Morton codes or Hilbert codes. The bit order of the target codes may be arranged from left to right according to geometry scale from largest to smallest; or arranged from left to right according to geometry scale from smallest to largest.

Specifically, the target bit number in the step S201C may be calculated according to the following method: acquiring a points number of the sorted point cloud data and a maximum side length corresponding to all the sorted point cloud data, wherein the maximum side length is the length of the longest side of the minimum cuboid bounding box corresponding to all the sorted point cloud data; acquiring a target mean points number of the groups to be encoded; and calculating the target bit number, wherein $$L = 3 * \left( \log_2(\text{maxSize}) - \frac{\log_2\left(\frac{N}{K_{mean}}\right)}{2} \right),$$

L is the target bit number, the bits before the last bits of the target bit number refer to the remaining bits after subtracting L bits from the total bits, maxSize is the maximum side length, N is the points number of the sorted point cloud data, and $K_{mean}$ is the target mean points number, maxSize is the maximum side length of all the sorted point cloud data with fixed-point geometry coordinates. Specifically, original geometry coordinates may be decimals, which are converted into integers and enlarged to a certain extent, so that coordinates of all points do not overlap due to integer conversion, and then the minimum cuboid bounding box of all the point clouds is calculated, and the length of the longest side of the minimum cuboid bounding box is taken as the maximum side length maxSize. $\log_2(\text{maxSize})$ represents a logarithmic function with base being 2 and power being max Size. Similarly, $$\log_2\left(\frac{N}{K_{mean}}\right)$$

represents a logarithmic function with base being 2 and power being $$\frac{N}{K_{mean}}.$$

The target mean points number $K_{mean}$ is a preset target mean value of the points number of the sorted point cloud data in all the groups to be encoded after grouping, which may be set and adjusted according to actual demands, and is not specifically limited here. After grouping according to the calculated target bit number, the actual mean points number $$K'_{mean}$$

of all the groups to be encoded is close to the above target mean points number $K_{mean}$. The formula for calculating the target bit number L is obtained based on the statistical characteristic of the point cloud data, that is, N is approximately proportional to the square of maxSize.

Specifically, the grouping method in the step S203C includes the following steps. After the rightmost continuous L bits are removed from the target codes (using the Hilbert codes, arranged from left to right according to geometry scale from largest to smallest), the numerical values of the remaining bits are compared, and the sorted point cloud data with the same values are grouped into one group to be encoded. Specifically, after the leftmost continuous L bits are removed from the target codes (using the Hilbert codes, arranged from left to right according to geometry scale from smallest to largest), the numerical values of the remaining bits are compared, and the sorted point cloud data with the same values are grouped into one group to be encoded. The physical meaning lies in that the sorted point cloud data with the same numerical values of the remaining bits belong to the same three-dimensional cube macro block, and the side length of the macro block is $S=2^{L/3}$, wherein L is the target bit number. Grouping the points in the same macro block into one group can enhance the spatial correlation of the sorted point cloud data in the same group. Specifically, referring to FIG. 13, the target codes (9-bit Hilbert codes) are acquired, L=3 is obtained according to the method in the step S201C, and grouping as shown in FIG. 13 is performed, that is, the first 6 bits are compared bit by bit, the sorted point cloud data point 1 and data point 2 are grouped into one group, and the sorted point cloud data point 3 and data point 4 are grouped into one group.

Optionally, in practical application, the target bit number can be dynamically changed during encoding and decoding, and the target bit number is denoted as Ld. Specifically, an initial target bit number L (initial state: Ld=L) is determined according to the above formula. During encoding and decoding group by group, variable parameters BN1 and BN2 are preset, wherein BN1<BN2, and BN1 and BN2 are positive integers greater than 0 (in an example, BN1 equals 2 and BN2 equals 8). Variable parameters KN and KM are preset, wherein KN<KM, and KN and KM are positive integers greater than 1 (KM is generally a multiple of KN). The mean value BN of the points number in KN encoded and/or decoded groups of the point cloud data is calculated, if BN is less than BN1, then Ld=Ld+1; if BN is greater than BN2, then Ld=Ld−1; otherwise, Ld is unchanged. It may be to adjust once after every KM groups of the point cloud are encoded and/or decoded.

Specifically, when the target bit number is dynamically changed during encoding, the grouping method in the step S203C includes the following steps. Based on the dynamically adjusted target bit number Ld, after the rightmost continuous Ld bits are removed from the target codes (using the Hilbert codes, arranged from left to right according to geometry scale from largest to smallest), the numerical values of the remaining bits are compared, and the sorted point cloud data with the same values are grouped into one group to be encoded. The physical meaning lies in that the sorted point cloud data with the same numerical values of the remaining bits belong to the same three-dimensional cube macro block, and the side length of the macro block is $S=2^{L/3}$, wherein L is the target bit number. Grouping the points in the same macro block in one group can enhance the spatial correlation of the sorted point cloud data in the same group.

In this embodiment, based on the above grouping method, the three-dimensional coordinate information of the point cloud data can be fully utilized to group points (i.e., the geometry points corresponding to the sorted point cloud data), ensuring that the geometry points in the group are closer in space, thus making the attribute values of the points more relevant, and finally improving the efficiency of decorrelation during intra-group transform, and obtaining better compression effects. Specifically, the more concentrated the energy is, the more efficiency the decorrelation is. When the correlation of the point cloud data in the group is higher, it is easier to concentrate the energy on DC coefficient and the first several AC coefficients after transform, and more small AC coefficients or more zeros can be obtained, which can improve encoding efficiency and encoding effects. Further, based on the grouping method provided by the embodiments of the present invention, the three-dimensional coordinate information can be effectively used to realize dynamic adaptive grouping, and grouping parameters can be dynamically adjusted (such as adjusting the target bit number L) for different types of point clouds (such as sparse point clouds scanned by LIDAR or dense point clouds used by VR), so as to improve grouping efficiency and encoding effects. Specifically, assuming that the density of a point cloud is uniform, the calculated value of L is larger for a sparse point cloud with the same target mean points number $K_{mean}$. For a dense point cloud, the calculated value of Lis smaller. Based on the above grouping method, the number of groups to be encoded is not too large, and the size of each group to be encoded is kept small, thus improving the performance of subsequent transform. If the size of the group to be encoded is too large, the correlation of the points in the group will decrease and the transform effects will be poor. If the number of groups to be encoded is too large, each group to be encoded needs to be transformed separately, which will take longer processing time and affect the efficiency of point cloud attribute encoding.

Specifically, in some embodiments, the grouped groups to be encoded are arranged according to the order in the step S100, corresponding to the encoding or decoding order. For example, the order corresponding to the first of the sorted point cloud data in each of the groups to be encoded is taken as the order of each of the groups to be encoded, so that the groups to be encoded are sorted according to the orders corresponding to the order of the first of the sorted point cloud data in each of the groups, and the sorting of the groups to be encoded is kept corresponding to the sorting in the step S100 as an inter-group order.

Optionally, the obtained groups to be encoded may be directly subjected to point cloud attribute encoding, or some of the groups to be encoded containing a larger amount of sorted point cloud data may be further subdivided and then subjected to point cloud attribute encoding. Specifically, in this embodiment, the points number of the sorted point cloud data in the groups to be encoded obtained by the above grouping method may be uncertain, and a transform matrix with a corresponding size needs to be provided when performing discrete cosine transform during encoding. If the points number of the sorted point cloud data in the groups to be encoded is uncertain, the size of the pre-provided transform matrix may not meet the requirement of the groups to be encoded, and the size of the corresponding transform matrix needs to be adjusted in real time, reducing the encoding efficiency. Therefore, some of the groups to be encoded containing a larger amount of the sorted point cloud data may be further subdivided and the maximum points number in each group may be defined, so that a maximum size of the transform matrix that needs to be provided in advance can be obtained and all required transform matrices can be provided in advance, thus improving processing speed.

Specifically, in this embodiment, as shown in FIG. 5, the step S300 includes the following steps.

Step S301: acquiring a maximum points number.

Step S302: for each group to be encoded, if the points number of the sorted point cloud data in the group to be encoded is greater than the maximum points number, taking the group to be encoded as a group to be subdivided; otherwise, taking the group to be encoded as a qualified group to be encoded.

Step S303: for each group to be subdivided, subdividing the sorted point cloud data in the group to be subdivided to acquire a plurality of target subdivided groups to be encoded, wherein the points number of the sorted point cloud data in each of the target subdivided groups to be encoded is not greater than the maximum points number.

Step S304: taking the qualified groups to be encoded and the target subdivided group to be encoded as target groups to be encoded.

Step S305: performing point cloud attribute encoding based on the target groups to be encoded.

The maximum points number is the maximum number of points in each group to be encoded, that is, the preset maximum points number of the sorted point cloud data in each of the groups to be encoded. In this embodiment, the maximum points number is denoted as $K_{max}$, which may be preset, or set and adjusted according to actual demands, and is not specifically limited here. For each obtained group to be encoded, determine whether the points number of the sorted point cloud data in the group to be encoded is greater than the maximum points number $K_{max}$. When the points number of the sorted point cloud data in a certain group to be encoded is greater than the maximum points number $K_{max}$, the group to be encoded may be further subdivided into smaller groups, and the aforementioned group to be encoded is regarded as a group to be subdivided; otherwise, the group to be encoded may be regarded as a qualified group to be encoded without further subdivision.

The group to be subdivided is further subdivided into a plurality of target subdivided groups to be encoded, wherein the points number of the sorted point cloud data in each target subdivided group to be encoded is not greater than the maximum points number $K_{max}$. All the qualified groups to be encoded and the target subdivided groups to be encoded are taken as target groups to be encoded, and point cloud attribute encoding is performed based on the target groups to be encoded.

Specifically, in the target groups to be encoded obtained after grouping and subdividing, the $i^{th}$ target group to be encoded has $K_i$ points, wherein $K_i=1, \ldots, K_{max}$, and $K_{max}$ is the maximum number of points, that is, the maximum points number in each target group to be encoded. The present invention can dynamically control the numerical value of $K_i$, that is, the number of points in different groups may be different during grouping, and the numerical value of $K_i$ is limited for convenient transform.

In this embodiment, it may be set that $$K_{mean} = \frac{K_{max}}{-2},$$

so that the number of points in each group to be encoded obtained by grouping meets the requirements, reducing the need for further subdivision.

Specifically, in this embodiment, among the plurality of target subdivided groups to be encoded corresponding to each group to be subdivided, the points number of the sorted point cloud data in each of the target subdivided groups to be encoded is not greater than the maximum points number, and the points number of the sorted point cloud data in other target subdivided groups to be encoded is equal to the maximum points number.

The specific method of obtaining the target subdivided groups to be encoded by subdividing may be set and adjusted according to actual needs, and is not specifically limited here. In an application scenario, for a certain group to be subdivided, the sorted point cloud data are grouped evenly according to $K_{max}$ (and the order of each sorted point cloud data), and the finally remaining sorted point cloud data are grouped as the last group. For example, one group to be subdivided includes 10 sorted point cloud data and $K_{max}$ is set to 8, then two target subdivided groups to be encoded with 8 and 2 sorted point cloud data are obtained.

Figure 6:
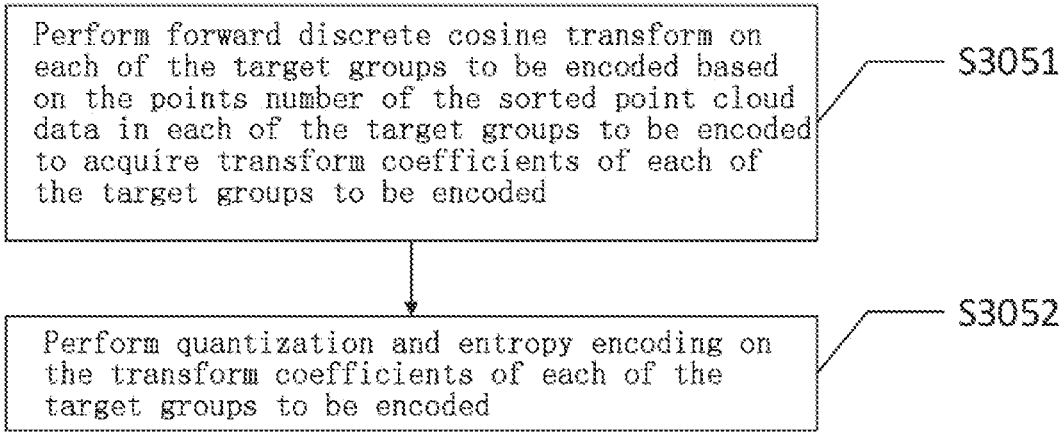
FIG. 6 is a specific schematic flowchart of step S305 provided in the non-limiting embodiments of the present invention in FIG. 5.

Specifically, in this embodiment, as shown in FIG. 6, the step S305 includes the following steps.

Step S3051: performing forward discrete cosine transform on each of the target groups to be encoded based on the points number of the sorted point cloud data in each of the target groups to be encoded to acquire transform coefficients of each of the target groups to be encoded.

Step S3052: performing quantization and entropy encoding on the transform coefficients of each of the target groups to be encoded.

Specifically, in this embodiment, the maximum value of the sorted point cloud data in each target group to be encoded $K_i$ is limited to $K_{max}$, then transform matrices corresponding to $K_i=1, \ldots, K_{max}$ may be provided in advance, thereby improving transform efficiency.

Specifically, the target groups to be encoded are sequentially attribute encoded according to the order in the step S100, wherein the order corresponding to each of the target groups to be encoded may be determined according to the order corresponding to the first of the sorted point cloud data in each of the target groups to be encoded. When encoding in groups, $K_i$-element forward discrete cosine transform (DCT) may be performed on the point cloud attribute values (or point cloud attribute residual values obtained based on attribute predictive values) to obtain transform coefficients. In an application scenario, a predictive value of the transform coefficient may be calculated to obtain a transform coefficient residual. The transform coefficient or transform coefficient residual obtained during encoding is quantized to obtain a quantized transform coefficient or quantized transform coefficient residual, and then the quantized transform coefficient or quantized transform coefficient residual is entropy encoded into a bit stream. Direct current (DC) coefficients and alternating current (AC) coefficients obtained by different $K_i$-element DCT forward transform may adopt different quantization step sizes. Specifically, quantization methods may be uniform quantization, uniform quantization with dead zone, non-uniform quantization, and the like. Specifically, the method of encoding each target group to be encoded may also refer to other encoding methods in the prior art, and is not specifically limited here.

Further, in the embodiments of the present invention, based on the AVS-PCC PCRM software version v3.0, the experimental results of the method in the embodiments compared with anchor method are tested, and the results are shown in the following Tables 1 and 2.

TABLE 1

| Limited lossy geometry, | End-to-end attribute rate distortion (intra) | | |
|---|---|---|---|
| lossy attribute | Luma | Chroma Cb | Chroma Cr |
| Color data set | −20.2% | −47.4% | −48.3% |

TABLE 2

| Lossless geometry, | End-to-end attribute rate distortion (intra) | | |
|---|---|---|---|
| lossy attribute | Luma | Chroma Cb | Chroma Cr |
| Color data set | −27.3% | −39.7% | −41.3% |

Table 1 is a rate distortion data comparison table of luma, and chroma under the condition of limited lossy geometry and lossy attribute, and Table 2 is a rate distortion data comparison table of luma, and chroma under the condition of lossless geometry and lossy attribute. According to Table 1 and Table 2, compared to the benchmark results of the test platform PCRM, under the conditions of limited lossy geometry and lossy attribute, and the conditions of lossless geometry and lossy attribute, for luma, the end-to-end attribute rate distortions of the present invention are reduced by 20.2% and 27.3% respectively; for chroma Cb, the end-to-end attribute rate distortions of the present invention are reduced by 47.4% and 39.7% respectively; for chroma Cr, the end-to-end attribute rate distortions of the present invention are reduced by 48.3% and 41.3% respectively. The point cloud attribute encoding method provided by the embodiments of the present invention achieves better encoding effects.

Figure 7:
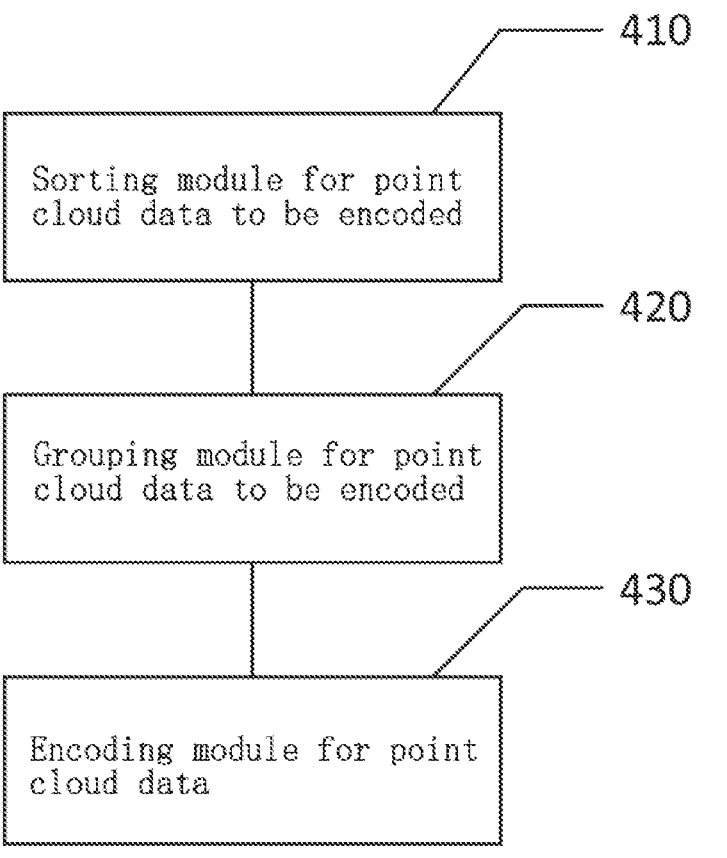
FIG. 7 is a schematic structure diagram of a point cloud attribute encoding apparatus provided in non-limiting embodiments of the present invention.

As shown in FIG. 7, corresponding to the point cloud attribute encoding method above, the embodiments of the present invention further provide a point cloud attribute encoding apparatus, wherein the point cloud attribute encoding apparatus includes the following modules.

A sorting module for point cloud data to be encoded 410 is configured for sorting all point cloud data to be encoded to acquire sorted point cloud data, wherein the point cloud data to be encoded are point cloud data with attributes to be encoded.

The point cloud data refers to a set of vectors in a three-dimensional coordinate system. In this embodiment, the point cloud data to be encoded may be point cloud data obtained by scanning, such as point cloud scanned by LIDAR, or point cloud used by VR, and the like. Each point cloud is recorded in the form of points, and each point contains three-dimensional coordinates and attribute information (such as color information and reflectance information). Point cloud encoding mainly includes geometry encoding and attribute encoding, and the embodiments of the present invention mainly implement the point cloud attribute encoding, such as encoding a color attribute of the point cloud.

A grouping module for point cloud data to be encoded 420 is configured for grouping the sorted point cloud data based on correlation between the sorted point cloud data to acquire groups to be encoded.

The correlation above reflects the correlation between the sorted point cloud data. When grouping, the point cloud data with strong correlation are grouped into one group. In an application scenario, a correlation evaluation rules and a correlation threshold may be preset, the correlation between the sorted point cloud data may be evaluated to obtain corresponding correlation values, and the sorted point cloud data with the correlation values being greater than the correlation threshold may be divided into the same group. In another application scenario, clustering may also be performed based on the correlation between the sorted point cloud data, which is not specifically limited here. Grouping based on the above correlation can effectively utilize the correlation between the point cloud data, so that attribute values of geometry points in each of the groups to be encoded have strong correlation.

An encoding module for point cloud data 430 is configured for performing point cloud attribute encoding based on the target groups to be encoded.

It can be seen from the above that the point cloud attribute encoding apparatus provided by the embodiments of the present invention sorts all the point cloud data to be encoded through the sorting module for point cloud to be encoded 410 to acquire the sorted point cloud data, wherein the point cloud data to be encoded are the point cloud data with attributes to be encoded; groups the sorted point cloud data based on the correlation between the sorted point cloud data to acquire groups to be encoded through the grouping module for point cloud data to be encoded 420; and performs point cloud attribute encoding based on the groups to be encoded through the encoding module for point cloud data 430. Compared with the prior art, in the solutions of the present invention, after sorting the point cloud data to be encoded, grouping is performed based on the correlation to obtain the groups to be encoded, and then the point cloud attribute encoding is performed based on the groups to be encoded. It is beneficial for enhancing the correlation between the point cloud data in the group, improving efficiency of decorrelation during intra-group transform after grouping, and improving encoding efficiency.

Specifically, in this embodiment, the correlation between the sorted point cloud data includes a spatial position relationship of the sorted point cloud data.

Specifically, in this embodiment, the specific method flow of the above-mentioned processing by the sorting module for point cloud data to be encoded 410, the grouping module for point cloud data to be encoded 420 and the encoding module for point cloud data 430 can refer to the specific description in the corresponding point cloud attribute encoding method, and will not be repeated here.

As shown in FIG. 8, corresponding to the point cloud attribute encoding method above, the embodiments of the present invention further provide a point cloud attribute decoding method, wherein the method includes the following steps.

Step A100: sorting all point cloud data to be decoded to acquire sorted point cloud data to be decoded, wherein the point cloud data to be decoded are point cloud data with attributes to be decoded.

Point cloud decoding mainly includes geometry decoding and attribute decoding, and the embodiments of the present invention mainly implement point cloud attribute decoding, such as decoding a color attribute of the point cloud.

Step A200: grouping the sorted point cloud data to be decoded based on correlation between the sorted point cloud data to be decoded to acquire groups to be decoded.

The correlation above reflects the correlation between the sorted point cloud data. When grouping, the point cloud data to be decoded with strong correlation are grouped into one group. In an application scenario, a correlation evaluation rules and a correlation threshold may be preset, the correlation between the sorted point cloud data to be decoded may be evaluated to obtain corresponding correlation values, and the sorted point cloud data with the correlation values being greater than the correlation threshold may be divided into the same group. In another application scenario, clustering may also be performed based on the correlation between the sorted point cloud data to be decoded, which is not specifically limited here. Grouping based on the above correlation can effectively utilize the correlation between the point cloud data, so that attribute values of geometry points in each of the groups to be decoded have strong correlation.

Step A300: performing point cloud attribute decoding based on the groups to be decoded.

It can be seen from the above that corresponding to the point cloud attribute encoding method above, the point cloud attribute decoding method provided by the embodiments of the present invention sorts all the point cloud data to be decoded to acquire the sorted point cloud data to be decoded, wherein the point cloud data to be decoded are the point cloud data with attributes to be decoded; groups the sorted point cloud data to be decoded based on the correlation between the sorted point cloud data to be decoded to acquire groups to be decoded; and performs point cloud attribute decoding based on the groups to be decoded. Compared with the prior art, it is beneficial for enhancing the correlation between the point cloud data in the group, improving decoding efficiency.

Specifically, in this embodiment, the correlation between the sorted point cloud data to be decoded includes a spatial position relationship of the sorted point cloud data to be decoded.

Specifically, in this embodiment, the step A100 includes: acquiring target codes corresponding to the point cloud data to be decoded, wherein the target codes are Morton codes or Hilbert codes; and sorting the point cloud data to be decoded according to an ascending order of the target codes to acquire the sorted point cloud data to be decoded.

Corresponding to the point cloud attribute encoding method above, the point cloud attribute decoding method provided by the embodiments of the present invention may also adopt different grouping methods. In an application scenario, the step A200 includes: acquiring a target size; dividing a target space based on the target size to obtain a plurality of space blocks, wherein the target space is a space where all the sorted point cloud data to be decoded are located, and the size of each space block is the same as the target size; and for each space block, grouping all the sorted point cloud data to be decoded in the space block into one group to be decoded. In another application scenario, the step A200 includes: acquiring a target bit number; comparing target codes of the sorted point cloud data; and grouping the sorted point cloud data to be decoded based on the last bits of the target bit number in the target codes to acquire the groups to be decoded. The specific grouping process may refer to the description in the above-mentioned point cloud attribute encoding method, and will not be repeated here.

Optionally, the obtained groups to be decoded may be directly subjected to point cloud attribute decoding, or some of the groups to be decoded containing a larger amount of the sorted point cloud data to be decoded may be further subdivided and then subjected to point cloud attribute decoding.

When the obtained groups to be decoded are directly subjected to point cloud attribute decoding, as shown in FIG. 9, the step A300 includes:

Step A301: performing entropy decoding and inverse quantization on each of the groups to be decoded to obtain transform coefficients of each of the groups to be decoded; and Step A302: performing inverse discrete cosine transform on the transform coefficients of the groups to be decoded based on the points number of the sorted point cloud data to be decoded in each of the groups to be decoded to obtain attribute reconstruction values corresponding to each of the groups to be decoded.

Specifically, in this embodiment, when some of the groups to be decoded containing a larger amount of the sorted point cloud data to be decoded are further subdivided and then subjected to point cloud attribute decoding, the step A300 includes: acquiring a maximum points number; for each group to be decoded, if the points number of the sorted point cloud data in the group to be decoded is greater than the maximum points number, taking the group to be decoded as a group to be subdivided; otherwise, taking the group to be decoded as a qualified group to be decoded; for each group to be subdivided, subdividing the sorted point cloud data to be decoded in the group to be subdivided to acquire a plurality of target subdivided groups to be decoded, wherein the points number of the sorted point cloud data to be decoded in the target subdivided groups to be decoded is not greater than the maximum points number; taking the qualified groups to be decoded and the target subdivided groups to be decoded as target groups to be decoded; and performing point cloud attribute decoding based on the target groups to be decoded.

The maximum points number is the maximum number of points in each group to be decoded, that is, the preset maximum points number of the sorted point cloud data contained in each of the groups to be decoded. The specific method flow of obtaining the target groups to be decoded by subdividing may refer to the description in the above-mentioned point cloud attribute encoding method, and will not be repeated here.

In this embodiment, when decoding in groups, entropy decoding may be performed on bit streams (that is, all groups to be decoded or target groups to be decoded) to obtain quantized transform coefficients or quantized trans-form coefficients residual, and then inverse quantization is performed to obtain a transform coefficient or a transform coefficient residual. For the obtained transform coefficient residual, based on the same transform coefficient prediction method as that in the encoding method, the transform coefficient can be obtained by addition. Then, K' ¿ (the number of sorted point cloud data to be decoded in each group to be decoded or target group to be decoded)-element inverse DCT transform is performed on the transform coef-ficients to obtain point cloud reconstruction attribute values or point cloud reconstruction attribute residual values. For the obtained point cloud reconstruction attribute residual value, based on the same attribute value prediction method as that in the encoding method, the reconstruction attribute value can be finally obtained by addition. Specifically, the decoding method for each group to be decoded or target group to be decoded may also refer to other decoding methods in the prior art, which is not specifically limited here.

Figure 10:
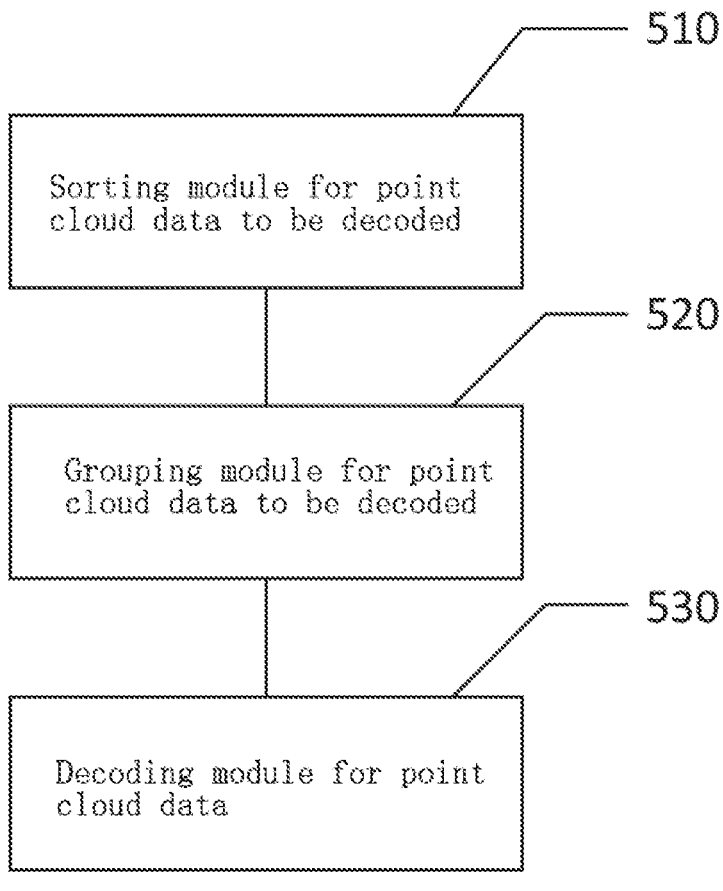
FIG. 10 is a structural schematic diagram of a point cloud attribute decoding apparatus provided in non-limiting embodiments of the present invention.

As shown in FIG. 10, corresponding to the point cloud attribute decoding method above, the embodiments of the present invention further provide a point cloud attribute decoding apparatus, wherein the point cloud attribute decod-ing apparatus includes the following modules.

A sorting module for point cloud data to be decoded 510 is configured for sorting all point cloud data to be decoded to acquire sorted point cloud data to be decoded, wherein the point cloud data to be decoded are point cloud data with attributes to be decoded.

The point cloud data refers to a set of vectors in a three-dimensional coordinate system. In this embodiment, the point cloud data to be decoded may be point cloud data obtained by scanning, such as point cloud scanned by LIDAR, or point cloud used by VR, and the like. Each point cloud is recorded in the form of points, and each point contains three-dimensional coordinates and attribute infor-mation (such as color information and reflectance informa-tion). The point cloud decoding mainly includes geometry decoding and attribute decoding, and the embodiments of the present invention mainly implement the point cloud attribute decoding, such as decoding a color attribute of the point cloud.

A grouping module for point cloud data to be decoded 520 is configured for grouping the sorted point cloud data to be decoded based on correlation between the sorted point cloud data to be decoded to acquire groups to be decoded.

The correlation above reflects the correlation between the sorted point cloud data to be decoded. When grouping, the point cloud data to be decoded with strong correlation are grouped into one group.

A decoding module for point cloud data 530 is configured for performing point cloud attribute decoding based on the groups to be decoded.

It can be seen from the above that the point cloud attribute decoding apparatus provided by the embodiments of the present invention sorts all the point cloud data to be decoded through the sorting module for point cloud to be decoded 510 to acquire the sorted point cloud data to be decoded, wherein the point cloud data to be decoded are the point cloud data with attributes to be decoded; groups the sorted point cloud data to be decoded based on the correlation between the sorted point cloud data to be decoded to acquire groups to be decoded through the grouping module for point cloud data to be decoded 520; and performs point cloud attribute decoding based on the groups to be decoded through the decoding module for point cloud 530. Compared with the prior art, in the solutions of the present invention, after sorting the point cloud data to be decoded, grouping is performed based on the correlation to obtain the groups to be decoded, and then the point cloud attribute decoding is performed based on the groups to be decoded. It is beneficial for enhancing the correlation between the point cloud data in the group, improving efficiency of decorrelation during intra-group transform after grouping, and improving decod-ing efficiency.

Specifically, in this embodiment, the specific method flow for the above-mentioned processing by the sorting module for point cloud data to be decoded 510, the grouping module for point cloud data to be decoded 520 and the decoding module for point cloud 530 can refer to the specific description in the point cloud attribute encoding method and/or point cloud attribute decoding method, and will not be repeated here.

Optionally, in this embodiment, the point cloud attribute decoding apparatus may also refer to the specific steps in the point cloud attribute encoding method above to perform corresponding decoding, for example, to perform inverse quantization based on the corresponding quantization step size in the point cloud attribute encoding method, which is not repeated here. In this way, the data encoded based on the point cloud attribute encoding method or apparatus above can be decoded.

Figure 11:
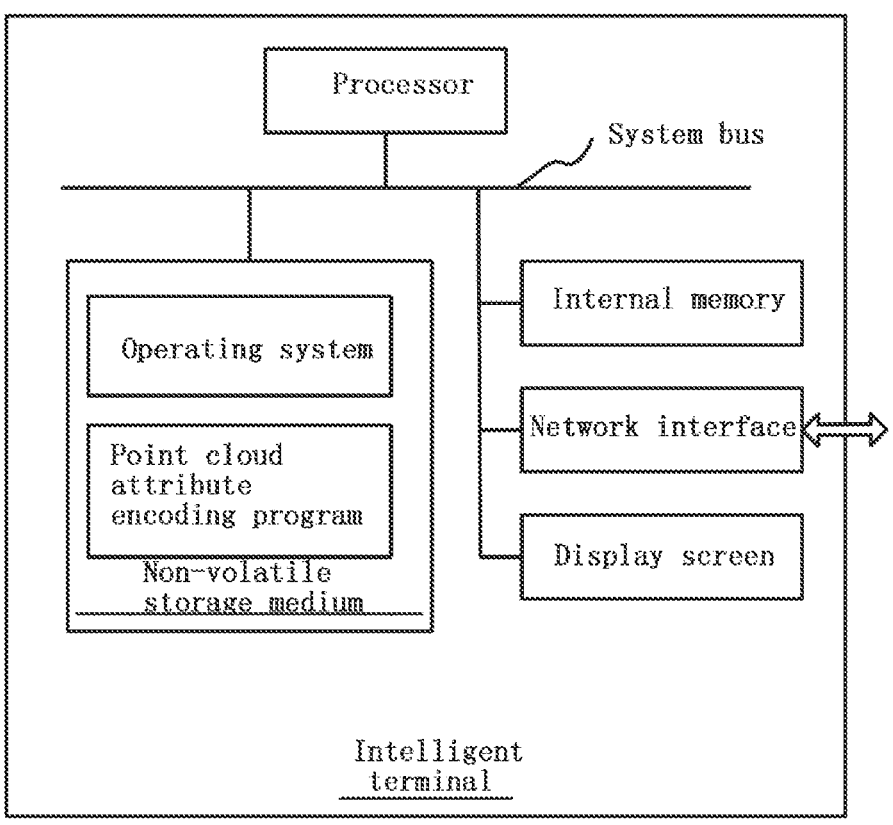
FIG. 11 is a block diagram of an internal structure of an intelligent terminal provided in non-limiting embodiments of the present invention.

Corresponding to the above embodiments, the present invention further provides an intelligent terminal, a block diagram of which is shown in FIG. 11. The intelligent terminal includes a processor, a memory, a network interface and a display screen connected via a system bus. The processor of the intelligent terminal is configured for providing computing and control capabilities. The memory of the intelligent terminal includes a non-volatile storage medium and an internal memory. The non-volatile storage medium stores an operating system and a point cloud attribute encoding program. The internal memory provides an environment for the operation of the operating system and the point cloud attribute encoding program in the non-volatile storage medium. The network interface of the intelligent terminal is used to communicate with external terminals through network connection. The point cloud attribute encoding program, when being executed by the processor, implements the point cloud attribute encoding method as described in any one of the embodiments above. The display screen of the intelligent terminal may be a liquid crystal display screen or an electronic ink display screen.

Those having ordinary skills in the art can understand that the block diagram shown in FIG. 11 is only a block diagram of some structures related to the solutions of the present invention and does not constitute a limitation on the computer device to which the solutions of the present invention is applied. The intelligent terminal may include more or fewer components than those shown in the figure, or may combine some components, or have different component arrangements.

In an embodiment, an intelligent terminal is provided. The intelligent terminal includes a memory, a processor, and a point cloud attribute encoding program stored in the memory and executable on the processor, wherein the point cloud attribute encoding program, when executed by the processor, performs the following operation instructions:

sorting all point cloud data to be encoded to acquire sorted point cloud data, wherein the point cloud data to be encoded are point cloud data with attributes to be encoded;

grouping the sorted point cloud data based on correlation between the sorted point cloud data to acquire groups to be encoded; and performing point cloud attribute encoding based on the groups to be encoded.

The embodiments of the present invention further provide a computer readable storage medium, wherein a point cloud attribute encoding program is stored on the computer readable storage medium, and the point cloud attribute encoding program, when executed by a processor, implements the point cloud attribute encoding method as described in any one of the embodiments of the present invention.

Optionally, the intelligent terminal and the computer readable storage medium may also store a point cloud attribute decoding program to realize the steps of the point cloud attribute decoding method.

It should be understood that the numerical order of the steps in the above embodiments does not imply a specific execution sequence. The execution order of each process should be determined based on its functionality and inherent logic and should not impose any limitations on the implementation process of the present invention.

It can be clearly understood by those having ordinary skills in the art that for the convenience and conciseness of description, only the division of the above-mentioned function units and modules is exemplified. In practical application, the above-mentioned functions may be allocated to and completed by different functional units and modules as required, that is, an internal structure of the apparatus is divided into different functional modules to complete all or part of the above-described functions. The functional units and modules in the embodiments may be integrated into one processing unit, or each unit may exist alone physically, or two or more units may be integrated into one unit, and the integrated unit may be implemented in the form of hardware or may be implemented in the form of a software functional unit. In addition, the specific names of the functional units and the modules are merely for facilitating mutual differentiation, and are not intended to limit the protection scope of the present invention. The specific working processes of the units and modules in the system described above may refer to the corresponding processes in the aforementioned method embodiments, and will not be described in detail here.

In the above-mentioned embodiments, the description of each embodiment has its own emphasis. For parts not detailed or recorded in an embodiment, please refer to the related description of other embodiments.

Those having ordinary skills in the art may be aware that, the exemplary units and algorithm steps described in combination with the embodiments disclosed herein can be implemented by electronic hardware or a combination of computer software and electronic hardware. Whether the functions are executed by hardware or software depends on particular applications and design constraint conditions of the technical solutions. Those having ordinary skills in the art may use different methods to implement the described functions for each particular application, but it should not be considered that the implementation goes beyond the scope of the present invention.

In the embodiments provided in the present invention, it should be understood that the disclosed apparatus/terminal devices and methods may be implemented in other ways. For example, the apparatus/terminal device embodiments described above are merely illustrative. For example, the division of the modules or units is only one logical function division. In practice, there may be other division methods. For another example, multiple units or components may be combined or integrated into another system, or some features may be ignored or not performed.

The integrated modules/units above may also be stored in a computer readable storage medium if being implemented in the form of a software function module and sold or used as an independent product. Based on such understanding, all or a part of the processes of the methods in the above embodiments of the present invention may also be implemented by instructing relevant hardware through a computer program. The computer program may be stored in a computer readable storage medium. The computer program, when executed by the processor, may implement the steps of each method embodiment mentioned above. The computer program includes a computer program code, which may be in the form of a source code, an object code, an executable file or some intermediate form. The above-mentioned computer readable medium may include: any entity or apparatus, recording medium, USB disk, mobile hard disk, magnetic disk, optical disk, computer memory, Read-Only Memory (ROM), Random Access Memory (RAM), electrical carrier signal, telecommunication signal and software distribution medium capable of carrying the computer program code. It should be noted that, the content contained in the computer readable storage medium may be appropriately increased or reduced according to the requirements of the law and patent practice in the jurisdiction of the judicial administration area.

The above embodiments are only used to illustrate the technical solution of the present invention, rather than limiting the present invention. Although the present invention has been described in detail with reference to the foregoing embodiments, those of ordinary skills in the art should understand that they can still modify the technical solutions set forth in the above embodiments, or make equivalent substitutions to part of the technical features thereof. However, these modifications or substitutions do not make the essence of the corresponding technical solutions deviate from the gist and scope of the technical solutions of each embodiment of the present invention, and should all be covered within the protection scope of the present invention.

What is claimed is:

1. A point cloud attribute encoding method, comprising:

sorting all point cloud data to be encoded to acquire sorted point cloud data, wherein the point cloud data to be encoded are point cloud data with attributes to be encoded;

grouping the sorted point cloud data based on correlation between the sorted point cloud data to acquire groups to be encoded; and performing point cloud attribute encoding based on the groups to be encoded;

wherein the grouping the sorted point cloud data based on correlation between the sorted point cloud data to acquire groups to be encoded, comprises:

acquiring a target size; dividing a target space based on the target size to obtain a plurality of space blocks, wherein the target space is a space where all the sorted point cloud data are located, and a size of each space block is the same as the target size; for each space block, grouping all the sorted point cloud data in the space block into one group to be encoded; or acquiring a target bit number; comparing target codes of the sorted point cloud data; grouping the sorted point cloud data to obtain the groups to be encoded by grouping the sorted point cloud data with the same last bits of the target bit number in the target codes into one group to be encoded; or acquiring a target bit number; comparing target codes of the sorted point cloud data; grouping the sorted point cloud data based on bits before the last bits of the target bit number in the target codes to acquire the groups to be encoded.

2. The point cloud attribute encoding method according to claim 1, wherein the correlation between the sorted point cloud data comprises a spatial position relationship of the sorted point cloud data.

3. The point cloud attribute encoding method according to claim 1, wherein the sorting all point cloud data to be encoded to acquire sorted point cloud data, comprises:

acquiring target codes corresponding to the point cloud data to be encoded, wherein the target codes are Morton codes or Hilbert codes; and sorting the point cloud data to be encoded according to an ascending order of the target codes to acquire the sorted point cloud data.

4. The point cloud attribute encoding method according to claim 1, wherein the acquiring a target size comprises:

acquiring a points number of the sorted point cloud data and a maximum side length corresponding to all the sorted point cloud data, wherein the maximum side length is a length of the longest side of the minimum cuboid bounding box corresponding to all the sorted point cloud data;

acquiring a target mean points number of the groups to be encoded; and calculating the target size, wherein $S=2^{L/3}$, $$L = 3 * \left( \log_2(\text{maxSize}) - \frac{\log_2\left(\frac{N}{K_{mean}}\right)}{2} \right),$$

S is the target size, L is a target bit number, maxSize is the maximum side length, N is the points number of the sorted point cloud data, and $K_{mean}$ is the target mean points number.

5. The point cloud attribute encoding method according to claim 1, wherein the acquiring a target bit number comprises:

acquiring a points number of the sorted point cloud data and a maximum side length corresponding to all the sorted point cloud data, wherein the maximum side length is a length of the longest side of the minimum cuboid bounding box corresponding to all the sorted point cloud data;

acquiring a target mean points number of the groups to be encoded; and calculating the target bit number, wherein $$L = 3 * \left( \log_2(\text{maxSize}) - \frac{\log_2\left(\frac{N}{K_{mean}}\right)}{2} \right),$$

L is the target bit number, maxSize is the maximum side length, N is the points number of the sorted point cloud data, and $K_{mean}$ is the target mean points number.

6. The point cloud attribute encoding method according to claim 1, wherein the grouping the sorted point cloud data based on the bits before the last bits of the target bit number in the target codes to acquire the groups to be encoded, comprises:

grouping the sorted point cloud data to obtain the groups to be encoded by grouping the sorted point cloud data with the same bits before the last bits of the target bit number in the target codes into one group to be encoded.

7. The point cloud attribute encoding method according to claim 1, wherein the acquiring a target bit number comprises:

dynamically adjusting the target bit number during encoding based on a statistical characteristic of a points number of the sorted point cloud data in encoded groups.

8. The point cloud attribute encoding method according to claim 7, wherein the dynamically adjusting the target bit number comprises:

determining an initial target bit number Ld;

presetting variable parameters BN1 and BN2, wherein BN1<BN2, BN1 and BN2 are positive integers greater than 0; and presetting variable parameters KN and KM, wherein KN<KM, KN and KM are positive integers greater than 1; and during encoding, calculating a mean points number BN of the sorted point cloud data in KN encoded groups; if BN is less than BN1, then Ld=Ld+1; if BN is greater than BN2, then Ld=Ld−1; otherwise, Ld is unchanged; adjusting once after every KM groups are encoded.

9. The point cloud attribute encoding method according to claim 1, wherein the performing point cloud attribute encoding based on the groups to be encoded, comprises:

acquiring a maximum points number;

for each group to be encoded, if a points number of the sorted point cloud data in the group to be encoded is greater than the maximum points number, taking the group to be encoded as a group to be subdivided; otherwise, taking the group to be encoded as a qualified group to be encoded;

for each group to be subdivided, subdividing the sorted point cloud data in the group to be subdivided to acquire a plurality of target subdivided groups to be encoded, wherein the points number of the sorted point cloud data in each of the target subdivided groups to be encoded is not greater than the maximum points number;

taking the qualified groups to be encoded and the target subdivided groups to be encoded as target groups to be encoded; and performing point cloud attribute encoding based on the target groups to be encoded.

10. The point cloud attribute encoding method according to claim 9, wherein among the plurality of target subdivided groups to be encoded corresponding to each group to be subdivided, the points number of the sorted point cloud data in one target subdivided group to be encoded is not greater than the maximum points number, the points number of the sorted point cloud data in other target subdivided groups to be encoded is equal to the maximum points number.

11. The point cloud attribute encoding method according to claim 9, wherein the performing point cloud attribute encoding based on the target groups to be encoded, comprises:

performing forward discrete cosine transform on each of the target groups to be encoded based on the points number of the sorted point cloud data in each of the target groups to be encoded to acquire transform coefficients of each of the target groups to be encoded; and performing quantization and entropy encoding on the transform coefficients of each of the target groups to be encoded.

12. A point cloud attribute decoding method, comprising:

sorting all point cloud data to be decoded to acquire sorted point cloud data to be decoded, wherein the point cloud data to be decoded are point cloud data with attributes to be decoded;

grouping the sorted point cloud data to be decoded based on correlation between the sorted point cloud data to be decoded to acquire groups to be decoded;

performing entropy decoding and inverse quantization on each of the groups to be decoded to obtain transform coefficients of each of the groups to be decoded; and performing inverse discrete cosine transform on the transform coefficients of each of the groups to be decoded based on the points number of the sorted point cloud data to be decoded in each of the groups to be decoded to obtain attribute reconstruction values corresponding to each of the groups to be decoded.

13. The point cloud attribute decoding method according to claim 12, wherein the correlation between the sorted point cloud data to be decoded comprises a spatial position relationship of the sorted point cloud data to be decoded.

14. An intelligent terminal, comprising a memory, a processor, and a point cloud attribute decoding program stored in the memory and executable on the processor, wherein the point cloud attribute decoding program, when executed by the processor, is configured to perform a point cloud attribute decoding method, comprising:

sorting all point cloud data to be decoded to acquire sorted point cloud data to be decoded, wherein the point cloud data to be decoded are point cloud data with attributes to be decoded;

grouping the sorted point cloud data to be decoded based on correlation between the sorted point cloud data to be decoded to acquire groups to be decoded;

performing entropy decoding and inverse quantization on each of the groups to be decoded to obtain transform coefficients of each of the groups to be decoded; and performing inverse discrete cosine transform on the transform coefficients of each of the groups to be decoded based on the points number of the sorted point cloud data to be decoded in each of the groups to be decoded to obtain attribute reconstruction values corresponding to each of the groups to be decoded.

* * * * *